United States Patent Office 2,891,672
Patented June 23, 1959

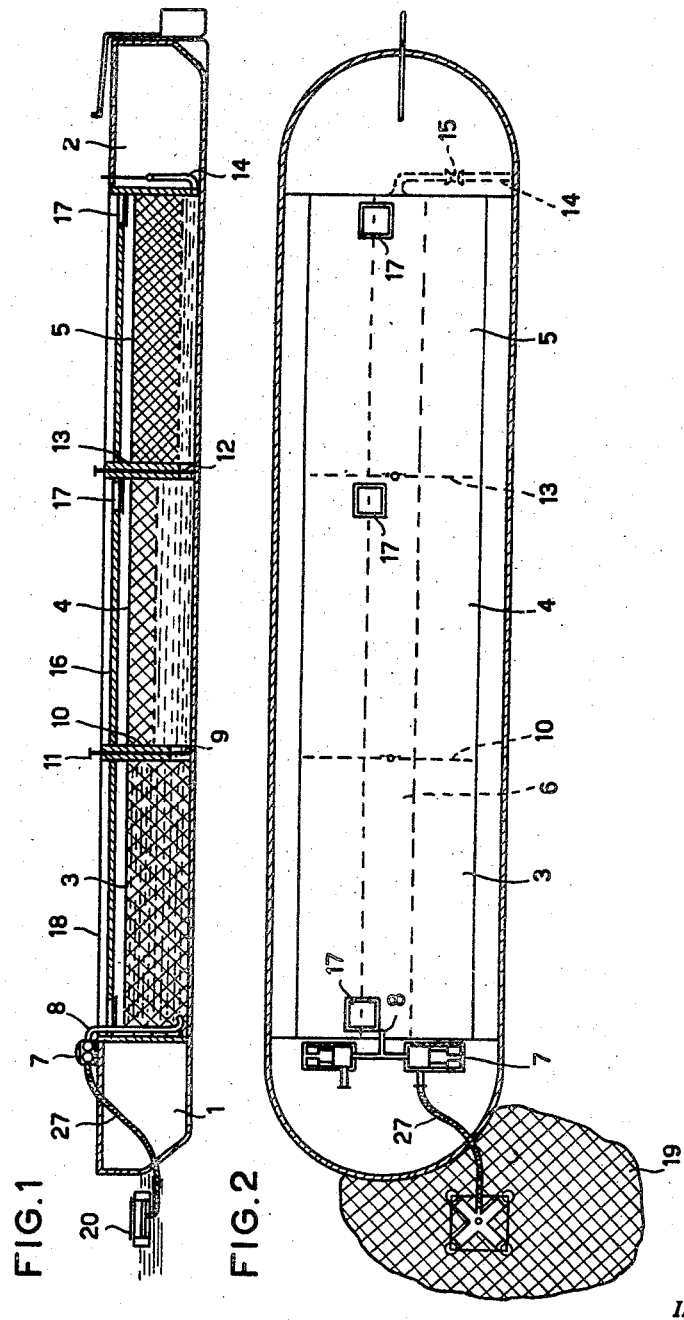

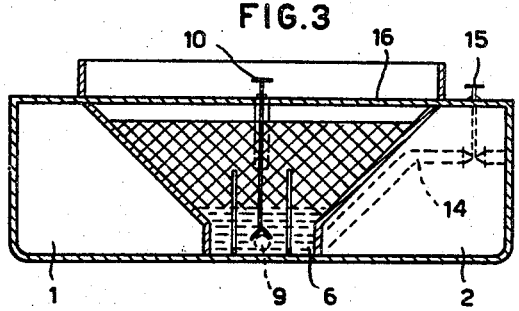
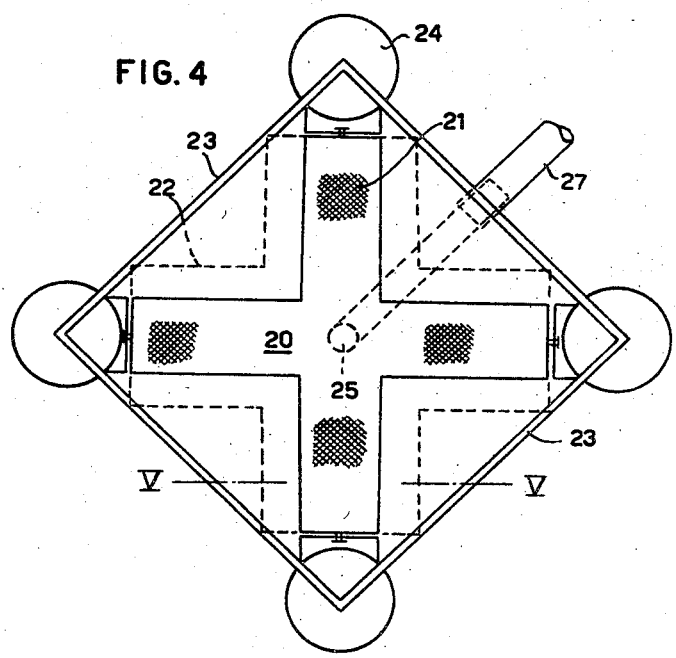
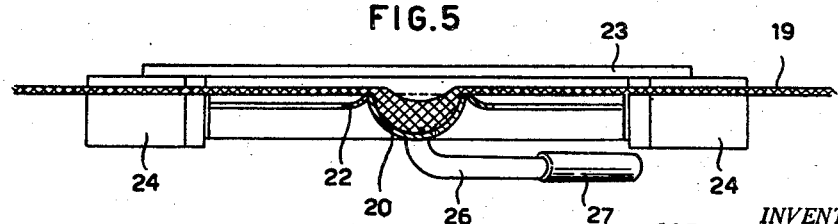

2,891,672

SHIP FOR RECEIVING, TRANSPORTING, AND SEPARATING IMMISCIBLE LIQUIDS OF DIFFERENT SPECIFIC GRAVITIES

Cornelis in 't Veld and Johannes in 't Veld, Vlaardingen, Netherlands

Application August 10, 1955, Serial No. 527,628

5 Claims. (Cl. 210—242)

For ships it often is necessary to drain off oil or mixtures of water and oil. Here one can think e.g. of water between the bilges of ships which is pumped up with the bilge pump, ballast water and the like which mostly is impurified with oil. The drained off oil forms oil spots on the water level which in harbours are very undesirable in many respects and may also cause deposits on beaches. As a result, fire and hygienic problems may arise.

The main object of the invention is to provide simple means to solve this problem in its various facets.

The present invention provides a ship for receiving and transporting mixtures of water and oil or other liquids with a lower specific gravity than water, which ship is provided with one or more pumps, the pressure side of which is connected to one or more settling and separation tanks of which at least one is provided with a discharge conduit for separated water.

According to the invention the ship is carried out as a long separation tank, if desired, subdivided by partitions with adjustable openings with a supply for mixture at the one end and a discharge for separated water at the other end which tanks have a cross section widening upwards.

Such a ship may be used in various manners, namely for receiving the impurified liquid immediately through the scupper holes of a ship, which liquid then immediately is separated in the ship, purified water being drained off from the ship during the reception of the impurified liquid. This means that the ship can receive a plurality of its own contents of impurified water. In the ship which preferably is a flat-bottomed ship, a liquid such as oil or the like is collected which may again be given a useful destination. During the construction particular attention can be paid to the separating function of the ship. Near the bottom the separation tanks have the shape of rather narrow gutters in which water settles, whilst said gutters widen upwards by divergent walls. In this part of the tanks the oil can well float upwards and be separated.

The discharge from the last tank should take place in such a manner that no turbulence during flowing occurs. It is for this reason that a simple siphon conduit provided with a valve is preferred which can very well be applied to a flat bottomed ship. Application of quietly operating pumps, however, is not excluded. The siphon conduit, of course, has the great advantage that no driving energy is necessary.

Preferably the ship is provided with boards at both sides of the upper face of the separation tanks and with covers in this upper face. The ship then, lying along side another ship, is able to receive impurified water which is difficult to be discharged through a hose, e.g. bilge water, which has been pumped up with the bilge pump, immediately on deck. This water then is guided via a cover to the inlet tank of the ship. The boards have the advantage of acting as mud guards in order to prevent spilling of impurified water. Besides receiving impurified water in this manner the deck with boards and covers can serve at the same time for storing thereon solids which have been impurified with oil or the like and to clean them, e.g. by means of spraying with hot water, whereby the rinsed water mixture can flow through the cover into the inlet tank.

The ship according to the invention is also particularly suitable for the removal of oil or the like from a water level. Then the ship is applied in combination with a device for removing a lighter-than-water liquid, such as oil from a water level which device is provided with one or more floats, supporting one or more collecting members which may be connected to a pump, the collecting members according to the invention consisting of one or more gutters which are directed downwards with their bottoms and at their bottoms being provided with a connection for a hose connecting the device floating free of a ship with a pump arranged on the ship. The gutters of such a device preferably may be adjustable in upward direction and are provided at both sides with horizontal flow screens.

In a practical embodiment two gutters in cross form are present. Such a device is arranged in the middle of an oil spot to be removed. By central evacuation of the liquid which has flowed into the cross gutter, a surface flow around the gutter in the direction of the gutter is obtained. This surface flow is furthered by the cohesion of the spot floating on the water. A good adjustment of the gutter is useful to obtain the best possible effect. To prevent clogging of the pumps and pipes preferably grids are arranged on the gutters. The oil-water mixture sucked from the gutters is guided via the hoses into the separation holds of the ship and separated there.

The application of a device according to the invention with gutters and floats which, consequently, are not stationarily built on the ship but movably connected therewith by means of one or more hoses has the great advantage that the oil spot can always be approached, e.g. also under piers and close to banks, whilst the ship remains at a distance and does not have a prejudicious influence on the spot. The means according to the invention form a mobile cleaning device for harbours and the like.

The drawing represents an embodiment and that in

Figure 1 a diagrammatic longitudinal section of a ship according to the invention coupled to an oil collecting device.

Figure 2 a plan view of the plant;

Figure 3 a diagrammatic cross section of the ship;

Figure 4 a plan view of the collecting device and

Figure 5 a section along the line V—V in Figure 4.

In the drawing a flat bottomed ship is represented with floating tanks 1 and 2 (Figure 3) and longitudinally extending separation tanks 3, 4 and 5, the bottom part of which forms a relatively narrow gutter (Figure 3) in which settling water may concentrate, this gutter strongly widening upwardly. In that part oil can float upwardly over a large surface, as desired. In the drawn embodiment three tanks in series are present. In tank 3, e.g. by means of a pump 7 with conduit 8 impurified water is supplied. The oil is indicated by cross hatching and the water by horizontal dotted lines. The tank 3 is connected by means of openings 9 in a partition 10, which openings may be controlled by a valve 11, with the tank 4 in which a separation takes place already. This tank 4 communicates through adjustable openings 12 in a partition 13 with a tank 5 where a substantially complete separation can take place. Water is discharged from the lower part of tank 5 by means of a siphon 14 with an adjustable valve 15. The siphon can be used because when applying the floating tanks 1 and 2 the impurified water level in the tanks in filled condition is higher than the water level outside (vide Figure 3). In the deck 16 there are covers 17. The deck is provided with boards 18; from a ship, e.g. through scupper holes, impurified water can simply be discharged on the spaces above the deck which water then can reach the separation tank through one or more of the covers. During this discharging the siphon 14 then may be open so that simultaneously with the discharging a separation takes place and the ship can finally sail away, mainly loaded with oil. Impurified liquid can also be supplied to the ship in another manner, e.g. directly from the river on which there is an oil spot 19. In said oil spot a device is arranged, consisting e.g. of a cross gutter 20 which is provided with grids 21 and at both sides with flow screens 22. The gutter is arranged in an upwardly adjusting direction to a floating frame 23, which is provided with a float 24.

The center of the gutter has an opening 25 and a connecting piece 26 for a hose 27 (vide also Figure 2). Figure 5 shows the position of the oil layer 19 in respect of the gutters 20 and how the removal through pipe 26 and hose 27 takes place.

Having now described our invention and the objects thereof, what we claim is:

1. A ship for receiving, transporting and separating mixtures of immiscible liquids of different specific gravities, said ship having vertically disposed apertured partition means therein for dividing the same into a plurality of liquid settling and separation tanks and having at least one pump thereon, the pressure side of each such pump being connected to at least one of the said settling and separation tanks, conduit means for discharging separated water therefrom, said conduit means being connected to one of said tanks, the hold of the ship being utilized as an elongated separation tank, means for supplying the said liquid mixture at one partitioned end thereof and discharge means for separating water at the other partitioned end thereof, the said tank having an upwardly diverging cross-section in its upper portion and a rectangular cross-section in its lower portion, the aforesaid conduit means being connected to the said lower portion.

2. A ship according to claim 1 in which the water discharge pipe is a siphon pipe provided with a valve.

3. A ship according to claim 1 in which boards are provided at both sides of the upper face of the separation tanks, at least one cover being provided in said face.

4. A ship according to claim 1 in which mud boards are provided at both sides of the upper face of the separation tanks, at least one cover being provided in said face.

5. The ship of claim 1 in which at least one transverse partition divides the ship into a plurality of tanks.

References Cited in the file of this patent
UNITED STATES PATENTS

| | | |
|---|---|---|
| 636,497 | Delattre | Nov. 7, 1899 |
| 745,519 | Pravicha et al. | Dec. 1, 1903 |
| 882,030 | Traulsen et al. | Mar. 17, 1908 |
| 1,107,391 | Welch | Aug. 18, 1914 |
| 1,127,137 | West | Feb. 2, 1915 |
| 1,337,279 | Sensibar | Apr. 20, 1920 |
| 1,530,078 | Haynes | Mar. 17, 1925 |
| 1,591,024 | Dodge | July 6, 1926 |
| 1,708,021 | Lenz et al. | Apr. 9, 1929 |
| 1,940,488 | Crowells | Dec. 19, 1933 |

FOREIGN PATENTS

| | | |
|---|---|---|
| 208,094 | Great Britain | Dec. 13, 1923 |